United States Patent [19]

Ruthven

[11] 4,403,474

[45] Sep. 13, 1983

[54] HYDROLIC FLUID-LUBRICATED PISTON-COMBUSTION ENGINE

[76] Inventor: William A. Ruthven, 170-C Manchester Dr., Basking Ridge, N.J. 07920

[21] Appl. No.: 253,185

[22] Filed: Apr. 13, 1981

[51] Int. Cl.³ .............................................. F04B 17/00
[52] U.S. Cl. .................................... 60/396; 60/419; 60/428; 60/595; 417/364; 417/393
[58] Field of Search ................. 60/396, 419, 428, 595, 60/712; 417/364, 380, 392, 393, 396

[56] References Cited

U.S. PATENT DOCUMENTS

| | | | |
|---|---|---|---|
| 1,741,731 | 12/1929 | Nordensson | 417/364 |
| 2,097,431 | 11/1937 | Brun | 417/364 |
| 2,782,613 | 2/1957 | Addie | 417/364 |
| 2,914,909 | 12/1959 | Kubik | 417/364 |
| 2,924,068 | 2/1960 | Pereda | 37/624.13 |
| 3,085,392 | 4/1963 | Sampietro | 60/595 |
| 3,106,896 | 10/1963 | Van Der Lely et al. | 60/595 |
| 3,119,230 | 1/1964 | Kosoff | 60/595 |
| 3,414,187 | 12/1968 | McMullin et al. | 417/364 |
| 3,643,638 | 2/1972 | Braun | 60/595 |
| 3,983,699 | 10/1976 | Hanis | 60/595 |
| 4,016,719 | 4/1977 | Yavnai | 60/595 |
| 4,097,198 | 6/1978 | Herron | 417/396 |
| 4,140,440 | 2/1979 | Ferris | 417/364 |
| 4,326,380 | 4/1982 | Rittmaster et al. | 417/393 |

*Primary Examiner*—George L. Walton
*Attorney, Agent, or Firm*—Wm. T. Hough

[57] ABSTRACT

In a preferred embodiment, for a turbine driven by hydraulic fluid, the combustion cylinder's piston is lubricated by the hydraulic fluid and drives the hydraulic fluid, and during the driven movement of the piston, movement of that piston causes the return reciprocal movement of another piston of another hydraulic combustion cylinder, and a starter motor is connected to drive both the turbine and the reciprocatable pistons.

9 Claims, 4 Drawing Figures

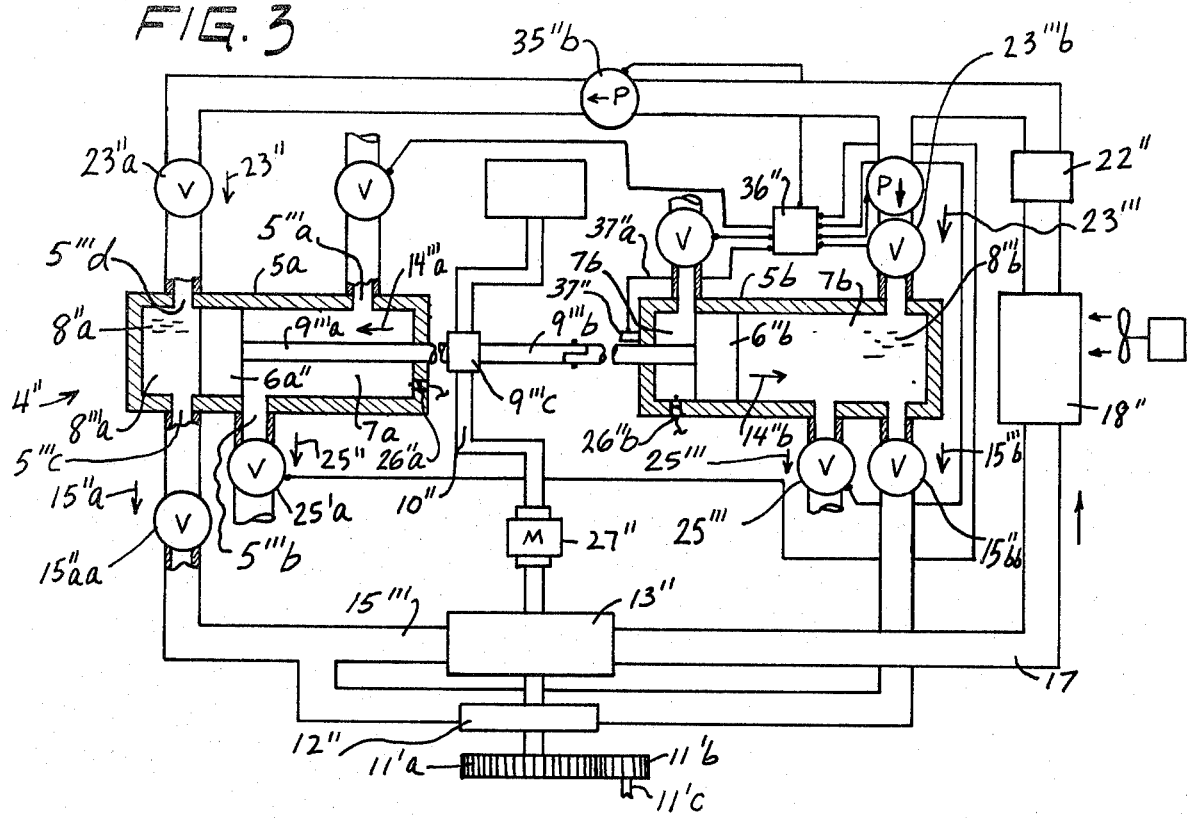
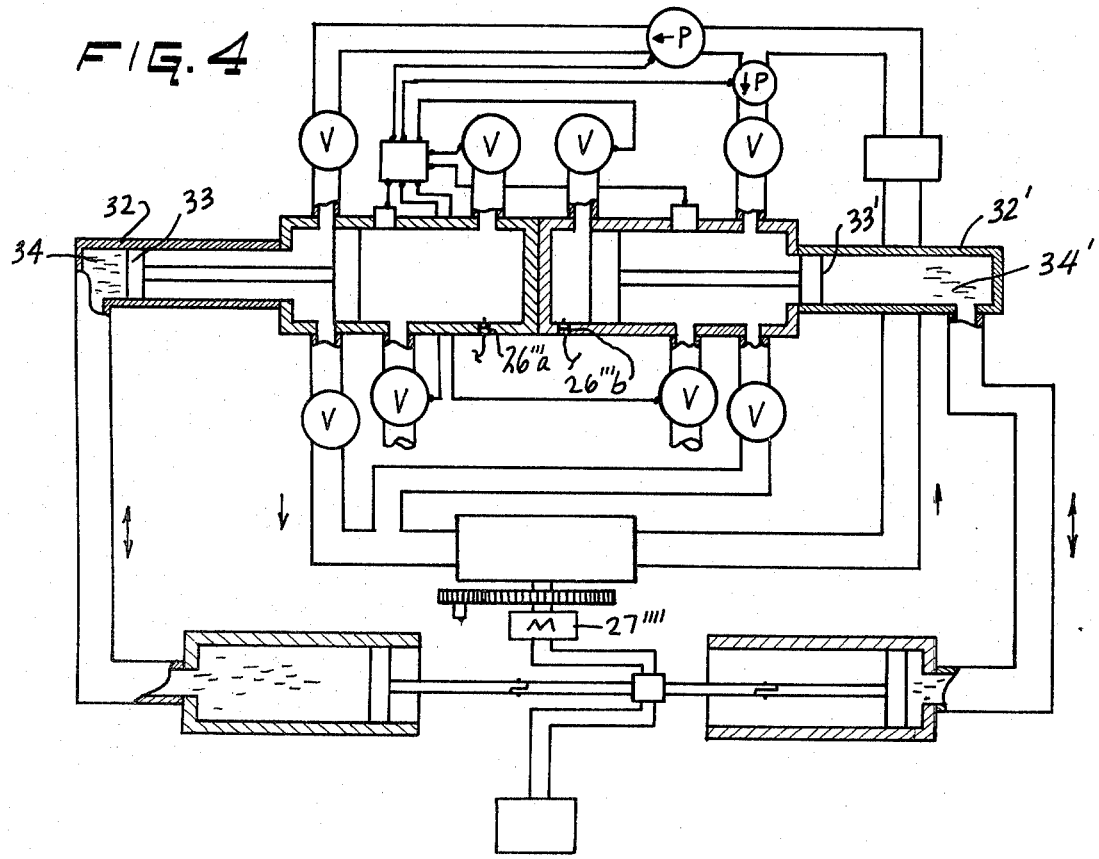

HYDROLIC FLUID-LUBRICATED PISTON-COMBUSTION ENGINE

This invention is directed to an improved combustion engine motor combination with a liquid turbine.

BACKGROUND TO THE INVENTION

Prior to the present invention, the combustion engine has heretofore involved many intermediate mechanical components all of which contributed to reducing net available power as compared to the gross energy of combustion of the gasoline or oil, for gasoline engines or diesel engines respectively. The complexity also added appreciably to the cost of production and thus to the sales price to the public, thus making the prior engines less competitive economically on the world market. With the increased costs of gasoline and oil, the necessity for improved motor efficiency to result in improved milage and reduced cost to the consuming public, together with an accompanying conservation of energy, has made it manditory that new and more efficient motors be designed to make such possible. Typical of motors having some associated hydraulic systems are the Pereda U.S. Pat. No. 2,924,068, Sampietro U.S. Pat. No. 3,085,392, Van Der Lely et al. U.S. Pat. No. 3,106,896, Kosoff U.S. Pat. No. 3,119,230, Hanis U.S. Pat. No. 3,983,699, for example. All such motors simple utilize hydraulic cylinders and pistons thereof by energy transmitted through a combustion engine piston rod, and where combustion engine cylinders are involved, utilize the convention approach and technology. Nothing in any of these patents is suggestive of the present invention, which is the first of its kind.

BROAD DESCRIPTION OF THE INVENTION

An object of this invention is to obtain improved efficiency in the gasoline motor and associated energy distribution system thereof.

Another object is to obtain an internal combustion engine of improved design having fewer moving parts and improved simplicity of design and operation.

Another object is to obtain an improved combustion engine and hydraulic turbine combination for a resulting dual function of hydraulic liquid to improve piston operation and energy distribution, and to obviate the need for crank case oil.

Another object is to obtain an improved starter motor combination for a combustion engine-hydraulic turbine combination.

Other objects become apparent from the preceding and following disclosure.

One or more objects of the invention are obtained by the invention as typically illustrated in accompanying diagrammatic drawings and illustrations, intended to improve understanding by illustrating preferred embodiment, but not intended to limit the invention thereto, which invention includes as well various non-preferred embodiment not necessarily illustrated but within ordinary skill of an artisan in this particular technology.

Broadly the invention may be described as a combustion engine, either gasoline or diesel, having the engine cylinder space divided by the intermediate piston into a combustion chamber at one end of the elongated combustion piston chamber, and a hydraulic liquid (normally termed "fluid") chamber at the other end of the elongated combustion piston chamber, with hydraulic fluid being present in the hydraulic fluid chamber with a valve-controlled inlet to feed the chamber when the piston moves toward the combustion chamber, and with a valve-controlled outlet to direct the pressurized hydraulic liquid (fluid) to a liquid turbine when the piston is moved away from the combustion chamber as the result of an explosive combustion within the combustion chamber; as a result of the hydraulic fluid being pumped by the combustion engine piston, the hydraulic fluid serves the multiple purpose of lubricating the combustion chamber piston, while concurrently simultaneously transmitting the energy of combustion by hydraulic pressure to the liquid turbine. While not illustrated as to seals utilized with the piston of the combustion chamber, such are conventional in nature and convention technology and knowledge are incorporated by reference hereinto, such not being the inventive aspect, but benefiting as an integral part of what here is termed the combustion chamber piston. Obviously such piston is reciprocatable in conventional fashion. Accordingly, the combustion piston chamber cyinder forms therein its elongated chamber above-noted, and has a fuel injection port in a conventional manner with conventional control mechanisms and timing circuitries, as well the exhaust port with its valve and the fuel inlet valve being properly arranged and timed as in conventional technology hereby also incorporated by reference, since the inventive aspect does not relate to these items except as they in conventional form are a part of the overall combination. The wall of the elongated chamber at the hydraulic fluid chamber portion end thereof, has the one-way inlet port for the hydraulic liquid's feed inlet, and has the one-way outlet port for the pressurized liquid's outlet to the liquid turbine for the driving thereof. Additionally there has to be, as a part of the combination for an operative system, a pressure-relief unit located serially after the liquid turbine, which allows for collection in reservoir fashion, of the excess hydraulic liquid driven from the hydraulic fluid chamber of the combustion piston chamber cylinder following an explosive combustion within the combustion chamber; however, it may be appreciated that in a system having more than one combustion piston chamber cylinder of the nature described-above, the hydraulic fluid effluent from the liquid turbine may be channeled directly into a replinishing other hydraulic fluid chamber as the reservoir-in-function, since that chamber would be in need of additional feed hydraulic liquid. It is not desirable to feed liquid hydraulic fluid directly from one hydraulic fluid chamber to another, devoid of first passing through the liquid turbine, since to do so would deminish the energy transmitted to the liquid turbine in the driving thereof.

In various preferred embodiments, mechanism for returning the piston toward the combustion chamber end of the elongated chamber includes a drive, such as a crank, driven by a drive shaft in-turn driven by the liquid turbine. However, in embodiments inclusive of multiple combustion piston chamber cylinders and systems as above-described, as a greater combination, there may be and preferably is a direct mechanical connection such as a piston shaft interconnecting pistons of multiple combustion piston chamber cylinders, while concurrently being connected to drive a drive shaft; in such embodiment, while a starter motor, as well as in all other embodiments in which preferably a starter motor drives both the piston and the turbine, there is necessarily a ratchet or slip clutch present in the combination such that the turbine is not normally driven by the piston-return mechanical structure at time of explosive combustion within the piston chamber(s). Also preferably the liquid turbine is fed by pressurized fluid coming from a multiplicity of chambers (two or more) such that there is a steady feed for maximum efficiency in the driving of the liquid turbine. Likewise, there may be a plurality of turbines, since more turbines would improve efficiency at some point, rather than indefinitely increasing the size of a single turbine for more than two combustion piston chamber cylinders and pistons thereof.

While such construction would require additional cost and equipment, there may be separate hydraulic fluid and segregated chamber therefor, apart from the driving hydraulic liquid above-described; in such instance, the utility of the present invention would be still present, in which the hydraulic liquid serves to lubricate the piston of the elongated chamber for its function in the combustion chamber portion.

Also, there is desirably in a preferred combination a radiator or other equivalent heat exchange cooling system included within the line of flow for receiving turbine effluent prior to sending the hydraulic liquid to the reservoir area or to replenish the chamber of another cylinder. Also, as within ordinary skill and technology, fuel to be injected may be preheated or further pressurized by being passed in heat exchange relationship with such radiator or heat exchanger.

It is important to note that a major saving on use of oil or oil-derived products is achieved by virtue of eliminating the need for crank-case oil. The utilization by this invention, of the hydraulic fluid as the lubricant for the piston of the combustion chamber cylinder obviates the need for a crank-case lubricant or oil. The magnitude of this saving may be recognized by multiplying the several quarts of oil needed for a single crank-case of a conventional automobile, by the number of automobiles in use throughout the United States. Then, that is further magnified by the need for constant replenishing of oil within the crank case, and the requirement for periodic replacement of the crank case oil. Additionally, there is the further benefit and energy conservation arrived at by improved efficiency of the motor of the design discussed-above, of simple design and operation.

THE FIGURES

FIG. 1 diagrammatically illustrates a one-cylinder embodiment of the present invention in a liquid turbine combination, shown in-part in cross-section for various elements as shall be discussed hereafter.

FIG. 3 illustrates a further and preferred embodiment in which a multiplicity of combustion piston chamber cylinders and elements thereof, are illustrated in back-to-back relationship, also diagrammatically and in-part cross-section for various elements thereof.

FIG. 4 illustrates an in-part view of a less-preferred but equivalent arrangement for the return-of-piston hydraulic mechanism utilizing a separate hydraulic fluid, also shown diagrammatically and in-part cross-section.

DETAILED DESCRIPTION OF THE INVENTION

Figure 1:
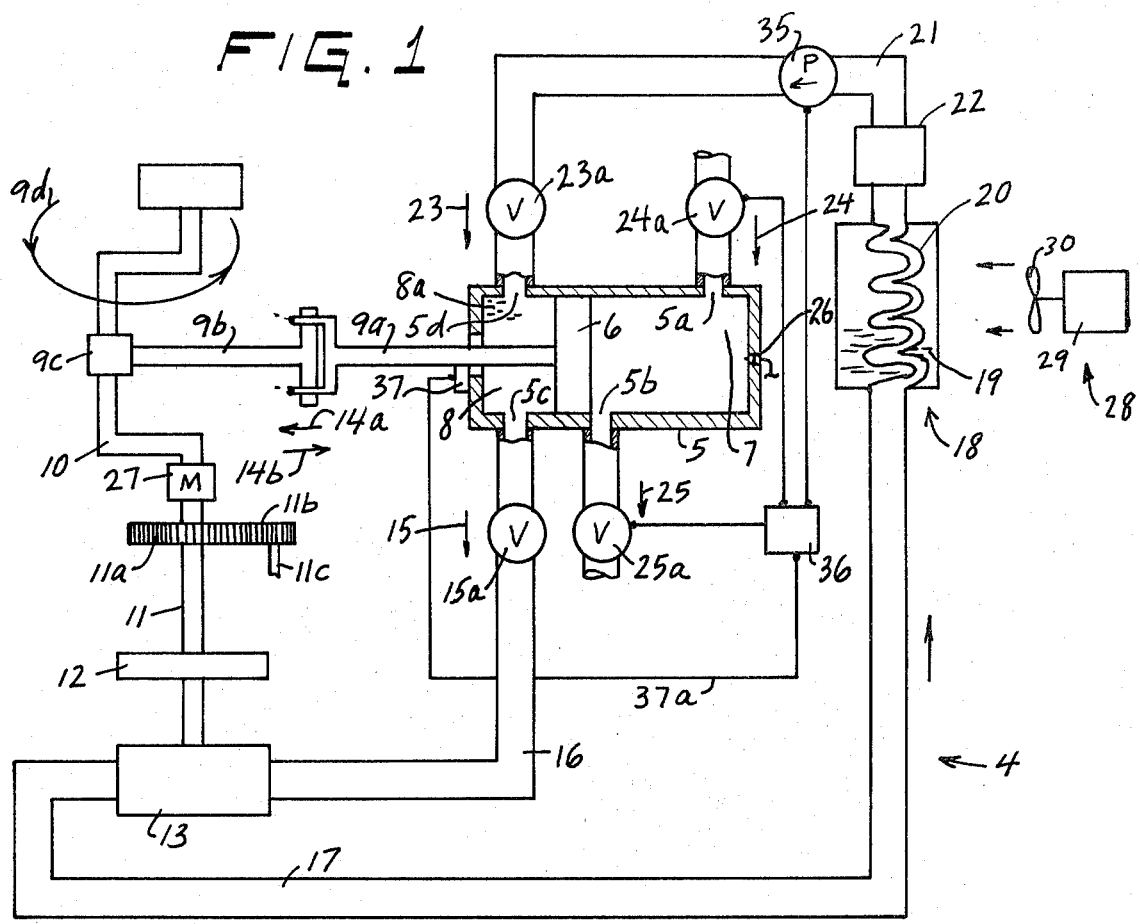
Figure 2:
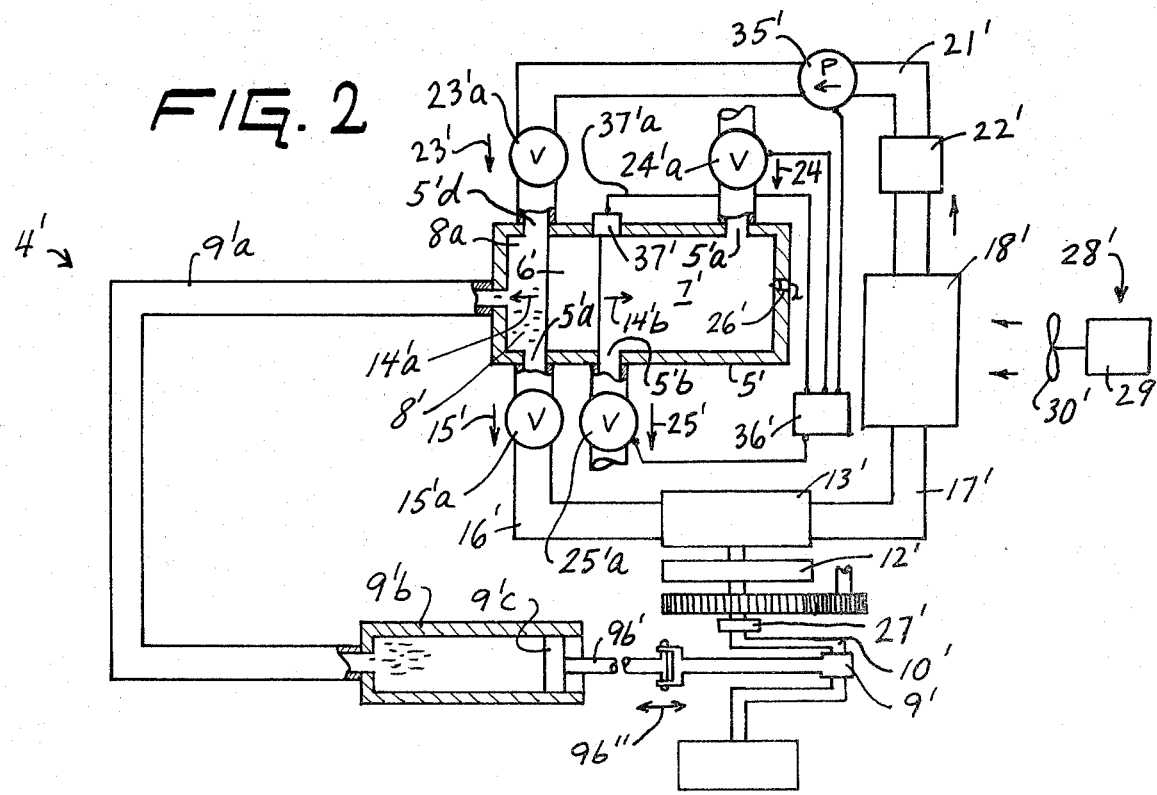
FIG. 2 illustrates an alternate embodiment diagrammatically, also in-part in cross-section, basically the same as that of the FIG. 1 embodiment in operation and function.

FIGS. 1 through 3 illustrate basically the same systems, with variations thereon, and accordingly common indicia are used in identification of identical elements in the different Figures.

In FIG. 1, there is illustrated the combustion engine-hydrolic turbine combination 4, and in FIG. 2 the combination 4′, and in FIG. 3 the combination 4″.

In the combination 4, there is included a combustion piston chamber cylinder 5 forming an elongated chamber having the space thereof divided by reciprocable piston 6 into the combustion chamber 7 and hydraulic fluid (liquid) chamber 8. In the walls of the cylinder 5, there is the fuel injection port 5a, the exhaust outlet port 5b, hydraulic fluid inlet port 5d and hydraulic fluid outlet port 5c. Piston shaft 9a has extension 9b hinged thereto, with the extension 9b rotatably mounted onto the crank at rotation joint 9c, onto crank 10. The crank 10 is not connected to the shaft 11. However, starter motor 27 is separately ut concurrently drivable of each of the crank 10 and by shaft 11, through conventional ratchet-arrangements well known in the art, incorporated into this disclosure. Accordingly, by starter motor 27 activation, each of the crank 9c and fluid 8a and thereby the fluid turbine 13 are initiated in their rotation as fuel is injected into the combustion chamber and with appropriate timing ignition sparks the spark plug 26 to bring about explosive combustion in chamber 7.

After explosive combustion in combustion chamber 7, the piston 6 is caused to move thereby toward the hydraulic fluid chamber 8, compressing the hydraulic fluid (liquid) 8a thereby causing it to exit through the one-way valve 15a of outlet port 5c, to be channeled through conduit 16 operatively through the liquid turbine 13 to thereby impel conventional rotars (not shown) of the conventional liquid turbine. As the piston 6 is initially moving toward the hydraulic fluid chamber 8, the valve 25a by conventional apparatus and controls and circuitry is held closed by a conventional timing device, until the piston 6 passes the exhaust outlet 5b at which time the valve 25 is permitted to open for one-way flow and exiting of exhaust gases from the combustion chamber 7. Accordingly, as the hydraulic fluid continues to flow in direction 15 as the piston moves in direction 14a, exhaust gases exit in direction 25. The revolving rotors of the liquid turbine 12 rotate the shaft 11 and flywheel 12 and the associated mounted gear 11a and meshing gear 11b and its drive shaft 11c. Effluent from the liquid turbine 13 flows through the conduit 17 into the radiator 19 typically cooled by a fan 28 having a fan motor 29 and fan blades 30. The radiator conduit 20 channels the cooled effluent into a reservoir 22, from which feed hydraulic fluid is again fed through the conduit 21 into the hydraulic fluid chamber 8 through the one-way valve 23a in direction 23, of the hydraulic fluid inlet port 5d.

At the end of travel of piston 6 in direction 14a, an appropriate timing circuitry initiates pump 35 to cause feed hydraulic fluid (liquid) to be pumped through one-way valve 23a into the hydraulic fluid chamber 8. Diagrammatically, the timing of valve 25a and pump 35 are controlled by timer 36 responsive to signals through lead 37a from sensor 37 that senses the relative positions of the piston shaft 9a. Such sensing devices are conventional technology as are such circuitries, and a part of prior art, hereby incorporated by reference hereinto.

These mere conventional elements are merely utilized for appropriate timing of valves and the pump, for appropriate fuel injection, exhausting of combustion gases, and feed-replinishing of hydraulic liquid into the hydraulic fluid chamber 8 when the piston 6 is moving in direction 14b. While as in convention technology, such timings and elements are required, such do not constitute the heart of the invention, already described fully above.

FIG. 2 shall be described solely in regards that it differs to any significant degree from the engine embodiment combination of FIG. 1.

Common to all embodiments of FIGS. 1, 2, 3 and 4, by appropriate conventional slip-clutches and/or ratchet arrangements, each of the motor and the turbine are connected to drive the crank that drives the pistons during return movements of the pistons during the compression stage for the combustion chamber(s). In particular, in FIG. 1, the motor 27 drives crank 10 but does not drive shaft 11; likewise, the revolving of shaft 11 by the turbine 12 causes the crank 10 to turn by action through the motor drive shaft with appropriate ratchets or slip clutches which prevent the revolving of crank 10 from driving either the motor 27 or the shaft 11. The same mechanism is true for each of the embodiments of FIGS. 2, 3, and 4.

FIG. 2 thus returns the piston 6' during the compression stage in direction 14'b at the end of the expansion stage movement in direction 14'a, by virtue of compression of fluid in chamber 9'b by piston 9'c advanced by the revolving crank 10', as the extension shaft 9b' moves alternately in directions 9b".

It should be noted that the sensors 37, 37' and the like are merely symbolic of some conventional sensing device that ascertains the relative position(s) of the combustion chamber piston in order to coordinate the timed opening of various valves such as 25a to emit exhaust fumes after the piston has moved-past that valve during the expansion phase following combustion in chamber 7, and such as the proper closing thereof before the piston returns past valve 25a, and such as the opening of the fuel-injection valve 24a at the beginning of the compression state as the piston 6 initially begins its movement in direction 14b after the closure of valve 25a, followed promptly by the closing of valve 24a as compression proceeds. Likewise, the timer 36 causes the pump to pump hydraulic fluid in direction 23 through one-way valve 23a as the piston begins its return movement in direction 14b, and to cease pumping before movement of piston 6 begins in direction 14a. In FIG. 1 the sensor 37 senses the position of the shaft 9a and thereby indirectly the position of the piston 6. In the symbolic locations for FIGS. 2, and 4, the sensor such as sensor 37' senses the piston 6' as it passes in FIG. 2. FIG. 3 illustrates an arrangement similar to that of FIG. 1.

It additionally should be noted that the invention does not reside in the selection of the particular hydraulic fluid such as hydraulic fluid 8a, for example, since any appropriate hydraulic fluid or anti-freeze type fluid that has the physical properties of a lubricant may be utilized, to thus serve as a replacement for the function normally filled by motor oil, to lubricate the movement of the pistons such as piston 6. Moreover, the pistons such as 6, 6', 6" and the like of the illustrated embodiments, include conventional sealing-rings and gaskets and the like normally and conventionally utilized with pistons for combustion engines.

In the embodiment of FIG. 3, operation is basically the same as in FIG. 2, except for the mechanical piston-return mechanism as illustrated, in which movement of piston 6a" in an expansion direction 14'''a simultaneously serves to move the piston 6"b in the same direction of its compression phase, and likewise when piston 6"b is moved by expansion of gases after combustion in direction 14"b, it likewise returns in the same direction the piston 6a".

It should be noted likewise that the illustrated spark plugs such as 26, 26' and the like of the embodiments illustrated, are conventionally timed to fire at the appropriate moment of optimal compression of the air-fuel mixture injected through the injection ports such as 5a, 5'a, and the like.

FIG. 4, like FIG. 2, has an alternate but equivalent hydraulic piston arrangement in series with the crank mechanism of the type of FIG. 2.

FIGS. 3 and 4 differ basically from the embodiments of FIGS. 1 and 2, by having in-effect coordinated or back-to-back separate combustion units as a larger typical combination, in each instance. The invention is clearly not limited to merely two such systems, but as in conventional combustion motors, may includes large numbers of piston combustion units, as might be desired or prove beneficial.

It is within the scope of the invention to make variations and substitution of equivalents and modifications as might be desired within the skill of the ordinary artisan in this field.

I claim:

1. A combustion engine comprising in combination: a combustion piston chamber means that forms at least one elongated chamber therein for the mounting therein of a reciprocable piston, with at least one fuel inlet port and exhaust outlet port positioned to be in flow communication with one end of the elongated chamber, and with at least one set of hydraulic fluid inlet and outlet ports positioned to be in flow communication with a opposite end of the elongated chamber and with at least one piston port also positioned to be in communication with said piston within the elongated chamber; said reciprocable piston mounted within the elongated chamber with the piston positioned such that its substantially forward face thereof extends transversely across an axis of a longitudinal length of the elongated chamber and the piston being mounted to freely move to and fro reciprocably along a longitudinal axis of the elongated chamber; piston force means for transmitting force to and movement with said reciprocable piston through said piston port, responsive to a starter means; and said starter means being drivably connected to drive said piston force means adapted such that said piston moves reciprocably within the elongated chamber; liquid turbine means having at least one inlet thereof connected in closed communication with the hydraulic fluid outlet port; hydraulic fluid reservoir means for containing expanding and contracting volume of hydraulic fluid, having at least one reservoir inlet port and at least one reservoir outlet port, the reservoir inlet port being in flow-communication with the turbine outlet port, and the reservoir outlet port being in flow-communication through valve means with each of the hydraulic fluid inlet and outlet ports of the elongated chamber; space of said elongated chamber adjacent said one end being a combustion chamber, and space adjacent said other end being a hydraulic fluid chamber, said combustion chamber being segregated from said hydraulic fluid chamber by said reciprocable piston; hydraulic fluid being present in said hydraulic fluid chamber and in said reservoir and in communication lines connecting the hydraulic fluid chamber with the liquid turbine means and the reservoir means such that the hydraulic fluid serves as lubricant around sides of the piston facilitating reciprocal movement of the reciprocable piston and such that said hydraulic fluid drives said liquid turbine means when said reciprocable piston is moved toward said opposite end; said valve means being for channeling said hydraulic fluid from said hydraulic fluid outlet port through said liquid turbine means and thereafter to said reservoir inlet port and simultaneously preventing flow to said reservoir means from said hydraulic fluid inlet port as said reciprocable piston moves toward said opposite end, and for channeling said hydraulic fluid from said reservoir outlet port to said hydraulic fluid inlet port of the hydraulic fluid chamber and simultaneously preventing flow from said reservoir means through said turbine means to said hydraulic fluid outlet as said reciprocable piston moves toward said one end; and combustion means for injecting fuel into said combustion chamber through the fuel inlet port and for explosively igniting and burning fuel within said combustion chamber and for exhausting spent exhaust fumes from the combustion chamber through the exhaust outlet port.

2. A combustion engine of claim 1, including drive shaft and gear means operatively connected to said liquid turbine means such that each of the drive shaft and gear means are drivable by the liquid turbine means; crank means connecting drivably the piston force means to the drive shaft and gear means; and starter means connected drivably to drive said crank means whereby the liquid turbine means begins to revolve functionally and whereby the piston begins to reciprocate within the elongated chamber.

3. A combustion engine of claim 2, in which said piston force means includes a piston shaft having a hinged extension drivably connected to said crank means.

4. A combustion engine of claim 3, in which said piston force means includes at least one hydraulic cylinder having a cylinder piston mounted therein with the hydraulic cylinder being mounted in operative flow communication with said hydraulic fluid chamber, and said piston shaft being drivably connected to said cylinder piston.

5. A combustion engine of claim 3, in which said piston shaft is drivably connected to said reciprocable piston, through said piston port of the elongated chamber.

6. A combustion engine of claim 5, including back-to-back with said combustion piston chamber means, a second set of second combustion chamber means and reciprocable piston and piston force means and liquid turbine means and valve means, substantially identically and operatively arranged and connected drivably to each of said liquid turbine means and said crank means, such that the reciprocable piston of the second set is moving toward a combustion chamber end when the reciprocable piston of the other elongated chamber is moving away from a combustion chamber end of that elongated chamber.

7. A combustion engine of claim 6, including a radiator cooling means through which effluent hydraulic fluid is passed and from which cooled hydraulic fluid is channeled onwardly to the hydraulic fluid reservoir means' inlet port.

8. A combustion engine of claim 1, including a radiator cooling means through which effluent hydraulic fluid is passed and from which cooled hydraulic fluid is channeled onwardly to the hydraulic fluid reservoir means' inlet port.

9. A combustion engine of claim 1, including a sparking means for initiating explosive combustion, mounted within said elongated chamber as a part of said combustion means.

* * * * *